United States Patent [19]
Gillich

[11] Patent Number: 4,997,588
[45] Date of Patent: Mar. 5, 1991

[54] CLEANER FOR LITHOGRAPHIC PRINTING PLATES FREE OF AROMATIC HYDROCARBONS

[75] Inventor: Thomas N. Gillich, Whitehouse Station, N.J.

[73] Assignee: Hoechst Celanese Corporation, Somerville, N.J.

[21] Appl. No.: 417,939

[22] Filed: Oct. 6, 1989

Related U.S. Application Data

[60] Division of Ser. No. 311,377, Feb. 14, 1989, Pat. No. 4,886,553, which is a continuation of Ser. No. 56,028, Jun. 1, 1987, abandoned.

[51] Int. Cl.[5] .......................... C09D 9/04; C11D 7/50

[52] U.S. Cl. .................................... 252/139; 252/162; 252/174.21; 252/174.25; 134/40; 134/42

[58] Field of Search .................... 134/40, 42; 101/451, 101/465; 430/331; 252/174.21, 162, 174.25, DIG. 14, DIG. 1, 139

[56] References Cited

U.S. PATENT DOCUMENTS 3,394,653 7/1968 Riesberg .
3,877,372 4/1975 Leeds .
3,882,038 5/1975 Clayton et al. .
3,887,497 6/1975 Ulvild .
4,028,281 6/1977 Millard et al. .
4,504,406 3/1985 Dhillon .
4,560,410 12/1985 Burns et al. .
4,576,743 3/1986 Kita et al. .

FOREIGN PATENT DOCUMENTS

2184689 A 12/1986 United Kingdom .

*Primary Examiner*—Paul Lieberman
*Assistant Examiner*—J. Silbermann
*Attorney, Agent, or Firm*—Richard S. Roberts

[57] ABSTRACT

The invention provides a cleaner for lithographic printing plates free of aromatic hydrocarbons consisting essentially of from about 3.0% to about 35.0% of a solvent component which is selected from the group consisting of ethoxylates and propoxylates of $C_1$ to $C_4$ alcohols; and from about 0.5% to about 7.0% sodium metasilicate; and from about 0.25% to about 6.0% of a non-ionic surfactant selected from the group consisting of polyoxy aryl ethers having a hydrophile-lipophile balance in the range of from about 10.5 to about 11.5; and from about 52.0% to about 96.25% water, wherein the percentages are by weight of the cleaner.

7 Claims, No Drawings

CLEANER FOR LITHOGRAPHIC PRINTING PLATES FREE OF AROMATIC HYDROCARBONS

Cross Reference to Related Applications

This application is a division of U.S. patent application Ser. No. 07/311,377, filed Feb. 14, 1989, now U.S. Pat. No. 4,886,553 which was a continuation of U.S. patent application Ser. No. 07.056,028, filed June 1, 1987, now abandoned.

BACKGROUND OF THE INVENTION

The present invention relates to lithographic printing or more particularly to a lithographic plate cleaner.

Lithography is a printing system taking advantage of the natural mutual repulsion between water and oils. The surface of a lithographic printing plate comprises areas which accept water and repel an oily ink, and areas which repel water and accept an oil ink. The former areas constitute non-image areas, and the latter areas constitute image areas.

Lithographic plates used in the graphic arts have image areas which are oleophilic and non-image areas which are hydrophilic and maintain the definition of the ink when the plate is used in the press to produce a clear image. After repeated use of the plate and aging of the surface, the non-image areas of the plate are less able to reject ink and may tend to retain some ink. This is called scumming.

Accordingly, if the surface properties between these two areas is disturbed, for example, if the hydrophilic property of the non-image areas is deteriorated for some reason, inks are apt to adhere to such hydrophilicity-deteriorated areas to cause background stains.

Such background stains are formed under various conditions. Typically, background stains are formed in the case where a lithographic printing plate is subjected to a burning-in treatment for the purpose of imparting high printing durability (i.e. run-length of printing) or in the case where the surface of a lithographic printing plate is allowed to stand in air without protection with a desensitizing gum.

The image areas of the plate may also become less oleophilic and hence less able to hold the ink. This may result in what is known as image blinding.

This results in poor quality printing and the lithographer must then extend a good deal of effort to restore the plate to a useful condition.

These phenomena sometimes occur even when operation of a printing machine is suspended, e.g. because of disorders during printing or for recesses. Therefore, it is common to apply a desensitizing gum onto the printing plate during suspensions of printing. Further, when a lithographic printing plate unprotected with a desensitizing gum is left to stand with olephilic substances being attached to the non-image areas thereof, such contaminated areas are rendered oil-sensitive, thus resulting in formation of stains. For example, the appearance of fingerprints in the background of prints is ascribed to this phenomenon. Furthermore, when the non-image areas take scratches, the scratches are filled with an ink and are generally rendered oil-sensitive to cause stains.

In these cases, it is usual that a printing ink is first removed from the lithographic printing plate and the stained plate is then treated with a plate cleaner for restoring the hydrophilic property of non-image areas.

Such a plate cleaner conventionally includes a cleaner comprising an aqueous solution of sodium silicate. However, this plate cleaner, despite of its very high desensitizing activity, is disadvantageous in that a part of an image is damaged or adhesion of an ink to image areas is deteriorated because of its alkaline property when it is applied to lithographic printing plates.

Cleansing agents hitherto used consist of dispersions and contain a number of heterogeneous substances such as, for example, in the dispersion described in U.S. Pat. No. 2,780,168, which serves as cleansing agents for greasy printing plates and contains, in the aqueous phase, monofunctional and multifunctional alcohols and a colloidal dispersion of silicic acid and, in its non-aqueous phase, preferably petroleum ether.

Various other compositions have also been used heretofore as cleansing solutions. For example, U.S. Pat. No. 3,108,535 employs various phosphonic acids. U.S. Pat. No. 3,289,577 uses various sulfonic acids. U.S. Pat. No. 3,060,848 describes a plate cleaner having significant amounts of aromatic solvents. Likewise U.S. Pat. No. 4,162,920 employes a substantial amount of aromatic solvents. Plate cleaners are also described in U. S. Pat. Nos. 2,780,186 and 3,679,479.

Furthermore, a plate cleaner using oxalic acid, as disclosed in U.S. Pat. No. 3,489,561, has a weak desensitizing property and an activity to corrode a metal support. Therefore, when it is applied to commonly employed lithographic printing plates comprising an aluminum plate as a support, the hydrophilic layer provided on the support, for example, a layer formed by a surface treatment to render hydrophilic, as described in U.S. Pat. No. 2,714,066, is susceptible to destruction to cause stains. Therefore, such a plate cleaner is not adequate for metal supports.

In general, when stains generate during printing, the printing plate surface is first treated with an ink removing hydrocarbon type solvents to remove the ink, and then with a desensitizing agents. The above-described plate cleaner is also used as a desensitizing agents after the removal of ink. This means that the treatment for cleaning the plate surface should be done over two steps.

The present invention improves upon the aforementioned cleaners and provides a cleaner which corrects and prevents toning and scumming and does not detrimentally affect the image or non-image areas of the plate and yet is essentially free of aromatic hydrocarbons.

SUMMARY OF THE INVENTION

The invention provides a cleaner for lithographic printing plates free of aromatic hydrocarbons consisting essentially of from about 3.0% to about 35.0% of a solvent component which is selected from the group consisting of ethoxylates and propoxylates of $C_1$ to $C_4$ alcohols; and from about 0.5% to about 7.0% sodium metasilicate; and from about 0.25% to about 6.0% of a non-ionic surfactant selected from the group consisting of polyoxy aryl ethers having a hydrophile-lipophile balance in the range of from about 10.5 to about 11.5; and from about 52.0% to about 96.25% water, wherein said percentages are by weight of the cleaner.

The invention also provides a method of cleaning a lithographic printing plate which comprises providing a metal based, imagewise exposed and developed lithographic printing plate having hydrophilic non-image areas and oleophilic image areas; and contacting both the image and the non-image areas with a cleaner which is free of aromatic hydrocarbons consisting essentially of from about 3.0% to about 35.0% of a solvent component which is selected from the group consisting of ethoxylates and propoxylates of $C_1$ to $C_4$ alcohols; and from about 0.5% to about 7.0% sodium metasilicate; and from about 0.25% to about 6.0% of a non-ionic surfactant selected from the group consisting of polyoxy aryl ethers having a hydrophile-lipophile balance in the range of from about 10.5 to about 11.5; and from about 52.0% to about 96.25% water, wherein said percentages are by weight of the cleaner, whereby the non-image areas are desensitized and rendered non-receptive of greasy ink and wherein the image areas are not removed by said cleaner.

DETAILED DESCRIPTION OF THE PREFERRED EMBODIMENT

As hereinbefore mentioned, the plate cleaner of this invention comprises an ethoxylate or propoxylate of $C_1$ to $C_4$ alcohols, sodium metasilicate, and certain non-ionic surfactant and water. In the preferred embodiment the cleaner does not contain any other ingredients.

The solvent component is an ethoxylate of propoxylate of $C_1$ to $C_4$ alcohols. Such include n-propoxy-propanol, 2-propoxyethanol, propyl or butyl carbitol and propoxy methanol. This component is preferably present in the composition in the range of from about 5.0% to about 25.0% and more preferably from about 10.0% to about 20.0%. In one particularly preferred embodiment the compound of choice is n-propoxy-propanol and in an amount of about 15% by weight. The n-propoxypropanol or analogous component serves to remove greasy ink from the plate surface. The sodium metasilicate serves to desensitize and re-hydrophilize the plate surface. It is preferably present in an amount of from about 1.0% to about 4.0% by weight of the cleaner and more preferably in an amount of from about 1.5% to about 3.0% by weight. In one particularly preferred embodiment it is present in an amount of about 2.5% by weight.

The nonionic surface active agent which is used in the present invention is effective to improve wettability of a plate surface and to remove a printing ink or make a printing ink distribution uniform, to thereby ensure the cleaning effect of the plate cleaner.

Examples of such a nonionic surface active agent are polyoxyethylene alkyl ethers, polyoxyethylene alkylphenyl ethers, sorbitan fatty acids esters, polyoxyethylene sorbitan fatty acids esters, polyoxyethylene sorbitol fatty acid esters, polyoxyethylene alkylamines, polyoxyethylene fatty acid esters, glycerin fatty acid esters, oxyethylene-oxypropylene block copolymers, and the like. Nonionic surface active agents having an HLB (i.e., hydrophile-lypophile balance) value in the range of from about 10.5 to about 11.5 are particularly preferred in the present invention. These nonionic surface active agents are preferably used in an amount of from about 0.05 to 4.0% by weight, and most preferably from about 1.0 to 2.5% by weight, based on the total weight of the plate cleaner.

In one particularly preferred embodiment the surfactant is nonyl phenol polyoxyethylene ethanol and is present in an amount of about 1.2% by weight.

The water component is present in an amount of from about 52.0% to about 96.25%; more preferably about 67.0 to about 93.5% and most preferably from about 74.5 to about 87.5% by weight of the cleaner.

The plate cleaner in accordance with the present invention can be used to remove background stains of a lithographic printing plate which are formed in any stage from plate making through printing. It exhibits a high ability to remove stains and is free from various problems as encountered with conventional plate cleaners, such as reduction in printing durabilty, reduction in adhesion of an ink to a printing image surface, and corrosion or damage of a hydrophlic surface of non-image areas.

The present invention will now be illustrated in greater detail with reference to examples, but it should be understood that the present invention is not limited to these examples. In examples, all percents and parts are given by weight unless otherwise indicated.

EXAMPLE 1

A solution is prepared by adding 45.0 g of sodium metasilicate ($5H_2O$), 300.0 g of Propasol P (n-propoxy propanol made by Union Carbide) and 24.0g of Synfac 8210 (polyoxy aryl ether nonionic surfactant produced by Milliken Chemicals) to 1631.0 g of soft water. The mixture is stirred for 10 minutes to produce a clear homogeneous solution. A portion of the clear solution is placed into a quart bottle equipped with a spray nozzle.

Exposed and developed N-50 negative acting lithographic printing plates produced by Enco Printing Products division of Hoechst Celanese Corporation running on a Harris M-1000 web press are allowed to set on press for a time sufficient to prevent clean roll-up and run conditions. Unacceptable printing in this instance is characterized as having background scum which is where the background on non-image area continues to produce copies having unwanted ink in the non-image area.

The prepared cleaner is sprayed into the plate as the press is running. The copies printed by the treated plate are observed to print acceptably clean copies within 20 impression while the untreated plates continue to print an unacceptably clean background. The other plates similarly treated and also product acceptable print quality. The run is continued for an additional 35,9000 impressions without incidence of background sensitivity.

EXAMPLE 2

A comparative plate cleaner, identified as Reviva (produced and sold by Howson, Carlstadt, N. J.) is likewise tested on a Harris M-1000 press as described in Example #1. This product is recognized as being useful for cleaning plates on a running web press. The results show that 80 or more impressions are required to obtain acceptable print quality. Several of the treated plates have areas which exhibit a slight degree of sensitivity. Additional treatment with Reviva does not fully eliminate the scum condition. The subject plates are then sprayed with the composition described in Example #1 and are observed to yield clean prints in about 15 impressions.

EXAMPLE 3

In like manner as described in Example #1, another comparative solution is prepared except that sodium lauryl sulfate, an anionic sulfactant, is directly substituted for the Synfac 8210. This solution is tested as further described in the example. Printed sheets after 200 copies still show an unacceptably scummed background. Although some ink residue is removed, there is insufficient emulsification to remove an adequate level so as to produce acceptable print.

EXAMPLE 4

In like manner as described in Example #1, another comparative solution is prepared except that trisodium phosphate is directly substituted for the sodium metasilicate. This solution is tested as further described in the example.

Printed sheets having acceptable print quality are observed after 60 impressions. As the run continues, the background begins to display a slight tint. After 5000 impressions the tink transfers to the printed sheet thereby producing unacceptable print. Close examination of the plate background shows attack of the hydrophilizing and anodic layer.

EXAMPLE 5

In like manner as described in Example #1, another comparative solution is prepared except that 2-propanol is directly substituted for the Propasol P. This solution is tested as further described in the example. Printed sheets after 500 impressions show an unacceptable scummed background. Close examination of the plate background shows that the solution used to treat the plate did not properly solvate the ink thereby not allowing for it to be emulsified and removed.

While the invention has been described in detail and with reference to specific embodiments thereof, it will be apparent to one skilled in the art that various changes and modifications can be made therein without departing from the spirit and scope thereof.

What is claimed is:

1. A cleaner for lithographic printing plates free of aromatic hydrocarbons consisting essentially of from about 3.0% to about 35.0% of a solvent component which is selected from the group consisting of ethoxylates and propoxylates of $C_1$ to $C_4$ alcohols; and from about 0.5% to about 7.0% sodium metasilicate; and from about 0.25% to about 6.0% of a non-ionic surfactant selected from the group consisting of polyoxy aryl ethers having a hydrophile-lipophile balance in the range of from about 10.5 to about 11.5; and from about 52.0% to about 96.25% water, wherein said percentages are by weight of the cleaner.

2. The cleaner of claim 1 wherein said surfactant is nonyl phenol polyoxyethylene ethanol.

3. The cleaner of claim 1 wherein said solvent component is n-propoxypropanol and is present in an amount of from about 5.0% to about 25.0% based on the weight of the cleaner.

4. The cleaner of claim 1 wherein the sodium metasilicate is present in an amount of from about 1.0% to about 4.0% based on the weight of the cleaner.

5. The cleaner of claim 1 wherein the non-ionic surfactant is present in an amount of from about 0.05% to about 4.0% based on the weight of the cleaner.

6. The cleaner of claim 1 wherein said surfactant is nonyl phenol polyoxyethylene ethanol and is present in an amount of from about 1.0 to about 2.5% by weight of the cleaner; and said solvent is n-propoxypropanol is present in an amount of from about 10.0% to about 20.0% based on the weight of the cleaner; and the sodium metasilicate is present in an amount of from about 1.5% to about 3.0% based on the weight of the cleaner; and the water is present in an amount of from about 74.5% to about 87.5% based on the weight of the cleaner.

7. The plate cleaner of claim 1 wherein said solvent is n-propoxy propanol and is present in an amount of about 15% and said sodium metasilicate is present in an amount of about 2.5% and said non-ionic surfactant is nonyl phenol polyoxyethylene ethanol and present in an amount of about 1.2% and the water is present in an amount of about 81.3% wherein said percentages are based on the weight of the cleaner.

* * * * *